May 27, 1952 J. A. WORCESTER, JR 2,598,478

DEGENERATIVE FEEDBACK RADIO AMPLIFYING SYSTEM

Filed Feb. 5, 1948

Inventor:
Joseph A. Worcester Jr.,
by Merton D. Moore
His Attorney.

Patented May 27, 1952

2,598,478

UNITED STATES PATENT OFFICE 2,598,478

DEGENERATIVE FEEDBACK RADIO AMPLIFYING SYSTEM

Joseph A. Worcester, Jr., Fairfield, Conn., assignor to General Electric Company, a corporation of New York Application February 5, 1948, Serial No. 6,368

3 Claims. (Cl. 179—171)

This invention relates to amplifying systems for radio receivers and the like, and more particularly to such systems in which degenerative feed-back arrangements are utilized to improve the bandwidth response characteristics thereof.

It is an object of this invention to provide an improved cascaded amplifier system in which a desired over-all gain may be realized and concurrently therewith broad bandwidth response characteristics may be maintained.

It is a further object of this invention to provide in such systems, means for controlling the gain of the various stages associated therewith, and wherein the bandwidth response characteristics of the system are substantially independent of the change in gain in these stages.

Still a further object of this invention is to provide alternatively, in such cascaded amplifier system, means whereby the over-all bandwidth response characteristics of the system are a function of the gain of the various stages.

Yet another object of this invention is to provide a cascaded amplifier system in which the bandwidth response characteristics of the system are a function of the gain of the various stages comprising the system, and wherein this gain and thus the bandwidth characteristics may be controlled manually when so desired or automatically in response to the strength of a received signal.

Figure 1:
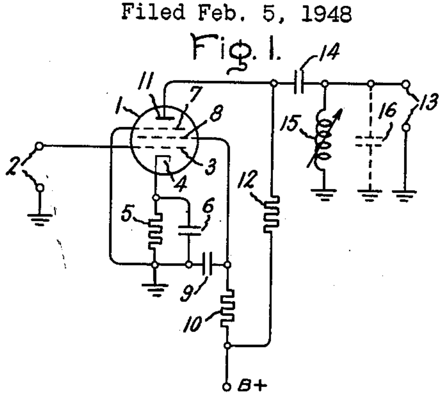
Figure 2:
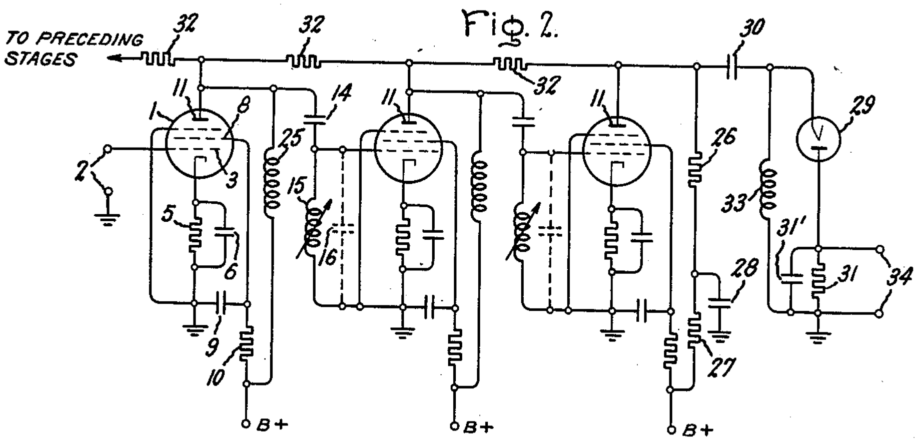
Figure 3:
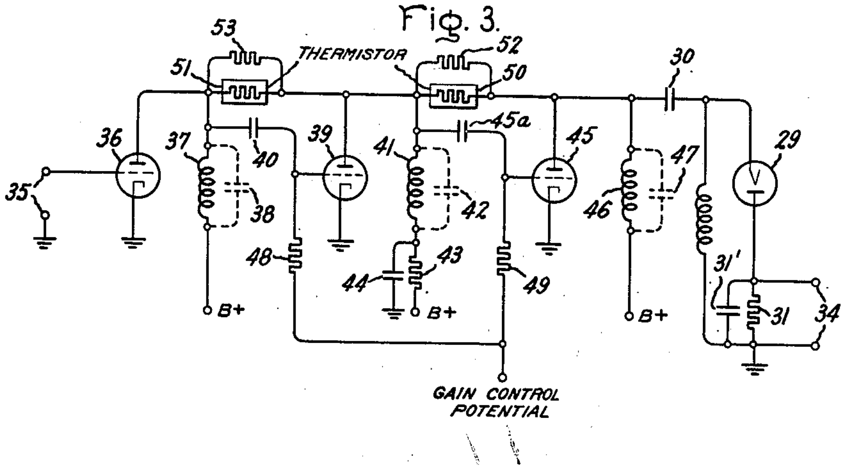

The features of this invention which are believed to be new are set forth with particularity in the appended claims. The invention itself, however, together with further objects and advantages thereof may best be understood by reference to the accompanying drawing wherein Fig. 1 shows a conventional single stage amplifying system useful in the development of the mathematical analyses of circuits embodying the present invention, Fig. 2 shows one embodiment of the invention, and Fig. 3 shows a preferred modification thereof.

Amplifier systems comprising single tuned circuits have been widely used due to their simplicity and ease of alignment. A single stage of such an amplifier is shown in Fig. 1. Referring now to this figure, an electron discharge device of the pentode type having a high mutual conductance is designated as 1. Signals to be amplified are received at the input terminals 2 and impressed between control electrode 3 and ground. Cathode 4 is connected to ground through a cathode biasing resistor 5 which is bypassed by capacitor 6. The suppressor electrode 7 is connected directly to ground, and screen electrode 8 is coupled to ground through capacitor 9, and to a source of unidirectional potential B+ through a resistor 10. Anode 11 is connected to the unidirectional source through load resistor 12, and further coupled to the output terminals 13 through a blocking capacitor 14. A tuned circuit comprising a variable inductance 15 and shunt capacitance 16 is coupled to load resistor 12 through capacitor 14, as shown, and to ground. Capacitance 16 usually comprises the stray capacitance of the discharge device and associated leads, and also the distributed capacitance of inductance 15.

The gain of such an amplifier may be represented by the formula:

$$G_s = G_m R \tag{1}$$

When $G_s$ is the gain of the single stage,
$G_m$ is the mutual conductance of the discharge device,
R is the resistance of load resistor 12.

The single stage bandwidth may be given by:

$$SB_w = \frac{1}{2\pi RC} \tag{2}$$

When $SB_w$ is the single stage bandwidth,
C is the capacitance of 16.

When a number of stages in cascade are utilized in order to provide sufficient gain, the over-all bandwidth is substantially:

$$B_w = \frac{1}{7.5RC\sqrt{N}} \tag{3}$$

Where $B_w$ is the overall band width,
N is the number of stages.

It is apparent that the over-all bandwidth decreases as the number of stages increases. It is necessary, therefore to determine the single stage bandwidth required to give a specified over-all bandwidth for a given number of stages. This may be given by:

$$SB_w = 1.2\sqrt{N} \times (B_w) \tag{4}$$

By combining Equations 2 and 4 it can be shown that the gain of a single stage is:

$$G_s = \frac{G_m}{2.4\pi C(B_w)\sqrt{N}} \tag{5}$$

And, therefore, the total gain is:

$$G = \left(\frac{G_m}{2.4\pi C(B_w)\sqrt{N}}\right)^N \tag{6}$$

An examination of Equation 6 shows that the total gain "G" tends to zero as the number of stages is increased, and the single stage bandwidth must be successively increased in order to keep the over-all bandwidth constant. It may be shown by differentiating Equation 6 and solving for a maximum, that the maximum gain for a given over-all bandwidth, or the maximum over-all bandwidth for a given total gain, occurs when the single stage gain is such that:

$$(7) \qquad G_s=\sqrt{e}$$

Where $e=2.718$.

It can therefore be found that for gains ordinarily required the maximum over-all bandwidth, that can be realized with the single tuned circuit, is about 5.0 megacycles, and occurs with approximately 18 stages. Hence, for practical purposes, the bandwidth limit appears to be about 3 megacycles and for applications requiring bandwidths in excess of this single tuned circuits of the conventional type are not feasible.

In accordance with the present invention, an amplifier system is provided, in which by means of a degenerative feedback arrangement, wider bandwidths for a given gain, or greater gain for the same bandwidths, than in the above-described single tuned circuits, may be realized, and in which the inherent simplicity of the single tuned circuits is maintained. Such a circuit is illustrated in Fig. 2 wherein like elements to those shown in Fig. 1 are designated by like indices.

Referring now to Fig. 2, there are shown by way of example three amplifier stages connected in cascade. The individual connections of these stages are similar to those of Fig. 1, except that in the present circuit a choke coil 25 replaces resistor 12 of Fig. 1 in the interstage coupling circuits. The anode 11 of the final amplifier stage is connected to the unidirectional source B+ through a load resistor 26 and dropping resistor 27, the latter being bypassed to ground by capacitor 28. This stage is coupled to the cathode of a rectifying device 29 through capacitor 30, this cathode being connected to ground through an inductance 33. The anode of device 29 is connected to ground through an output resistor 31 which is bypassed by capacitor 31'. Output signals may be obtained across load resistor 31, by means of terminals 34, as shown. Feedback is effected by means of resistor 32 connecting the anode of the discharge device associated with each amplifying stage to the anode of the device included in the preceding stage.

An approximate mathematical analysis may be made of the above-described circuit, and the resulting equations are sufficiently accurate for usual design purposes. Assuming that there is complete feedback loading, that is, infinite anode loading, the equivalent load resistor in a particular stage is, then, the actual value of the feedback resistor divided by the gain of the discharge device associated with this stage.

Equation 1 may therefore be modified as follows:

$$G_s=G_m\times\frac{R_D}{G_s}$$

Where, $R_D$ is the resistance of the feedback resistor 32. Or $$(8) \qquad G_s=\sqrt{G_mR_D}$$

Equation 8 is sufficiently accurate for most purposes but this equation is inaccurate for extremely low gains. When the case where $$G_m=\frac{1}{R_D}$$

is considered, it is evident that the gain in this instance is zero, since the transfer through the feedback resistor 32 equals the transfer of energy through discharge device 1, and device 1 introduces a 180° phase reversal. Hence, to account for this, it is necessary to modify Equation 8 as follows:

$$(9) \qquad G_s=\sqrt{G_mR_D}-1$$

When the anode loading or effective anode loading is appreciable due to a finite inductance quality factor and discharge device input conductance, the gain formula may be altered as follows:

$$(10) \qquad G_s=\sqrt{G_mR_D}-1-\frac{R_D}{2R_L}$$

Where $R_L$ is the equivalent load resistance.

The single stage bandwidth of this system, as indicated in Equation 2, can similarly be modified for the present system by substituting $$\frac{R_D}{G_s}$$

for R and hence:

$$(11) \qquad SB_w=\frac{G_s}{2\pi R_DC}$$

When Equation 11 is combined with Equation 8 there results:

$$(12) \qquad SB_w=\frac{1}{2\pi C}\cdot\sqrt{\frac{G_m}{R_D}}$$

Equation 12 is sufficiently accurate for all practical purposes.

The next consideration is the proper termination of the feedback chain. This is determined by the value of the final stage load resistor 26. This value should be such that the gain of the final stage, in the absence of feedback, is equal to the gain of the degenerative previous stages. That is $$R_1=\sqrt{\frac{R}{G_m}}$$

where $R_1$ is the value of resistor 26. When this termination is provided it may be shown that the over-all bandwidth for "N" stages is equal to the single stage bandwidth. Hence:

$$(13) \qquad B_w=\frac{1}{2\pi C}\cdot\sqrt{\frac{G_m}{R_D}}$$

Therefore, it is apparent that by utilizing the degenerative amplifiers in cascade in accordance with the present invention, a desired gain may be realized with no loss in the over-all bandwidth response of the amplifier systems as various amplifier stages are cascaded therein, and an amplifying system is thus provided with broadband response characteristics and high amplifying properties.

A modification of the invention is shown in Fig. 3, which illustrates the circuit of an amplifying system embodying the invention wherein the over-all bandpass characteristics of this system may be made either constant, or controlled manually or automatically in response to the strength of the applied signal.

It was shown in Equation 13 that the over-all bandwidth of the degenerative amplifier is:

$$B_w=\frac{1}{2\pi C}\sqrt{\frac{G_m}{R_D}}$$

From the above it is evident that manual or automatic volume control which operates by varying the mutual conductivity ($G_m$) of the discharge device, also varies the bandwidth of the amplifying system.

In some instances, in the reception and amplification of radio signals it may be desired to have constant bandwidth in the amplifier system for change of gain of the system, and in others it may be desirable to have the bandwidth limits increase for strong signals and hence to vary inversely with the required mutual conductance ($G_m$). Either of the above results may be obtained by providing a degenerative resistor in the feedback circuit of the individual stages, having a resistance value which varies inversely with the mutual conductance of the discharge device. When the inverse relation is linear, $$\frac{G_m}{R_D}$$

remains constant and the bandwidth limits also remains constant. When the degenerative resistance varies to a higher rate than the mutual conductance of the discharge device, the desired expansion of the bandwidth limits as the gain is decreased is attained.

Referring now to Fig. 3 signals to be amplified are impressed across terminals 35 and thereby applied to the control electrode of amplifier device 36. The cathode of device 36 is connected to ground and the anode is coupled to a source of unidirectional potential B+ through choke coil 37 having distributed capacitance 38. The anode of device 36 is coupled to the control electrode of device 39 through a capacitor 40. The anode of device 39 is coupled to a source of unidirectional potential B+ of higher value than the previous mentioned source B+ through a choke coil 41 having distributed capacitance 42 and through serially connected resistor 43 which is bypassed by capacitor 44. The anode of device 39 is coupled to the control electrode of amplifier device 45 through capacitor 45*a*. The cathodes of devices 39 and 45 are connected to ground. Anode of device 45 is coupled to source B+ through choke coil 46 having a distributed capacitance 47. The output of the amplifier system is detected in a usual detector stage that may be similar to that of Fig. 2 and which is accordingly indicated by like numerals to the previous indicator circuit.

Gain control may be applied to the control electrodes of devices 39 and 45 through resistors 48 and 49 respectively. This control may be manual or it may be of the well known automatic volume control variety.

Degenerative resistors 50 and 51 are connected between the anodes of the discharge devices 36, 39 and 45, as shown, and have the characteristics that the resistance value of these resistors is a reverse function of the current flowing therethrough. These types of resistances are usually referred to as "thermistors." The anode circuits of devices 36 and 45 are connected directly to the unidirectional potential source B+ through choke coils 37 and 46 respectively, as previously described. The anode circuit of device 39 is connected to source B+ through choke coil 41 and resistor 43. Resistor 43 is of such a value that when no gain potential is applied, the anode potentials of devices 36, 39 and 45 are substantially equal. There is therefore no appreciable potential difference across thermistor resistors 50 and 51 and they exhibit relatively high resistance.

Further resistors 52 and 53 may be included in shunt respectively with the thermistor resistors 50 and 51 to provide a better control of the degenerative resistance when the condition of maximum control conductance obtains.

The application of control potential through resistors 48 and 49 to the control electrode of devices 39 and 45 results in a change in the mutual conductance of these devices and hence in their respective anode current. This change in anode current alters the potential drop across resistor 43 which results in a proportionate change in the potential in the anode of device 39 as compared to the anode potentials of devices 36 and 45. This difference in anode potentials between the discharge devices produces a net potential across the degenerative thermistors 50 and 51 and in accordance with the properties thereof their resistance value also changes.

As previously stated, thermistors 50 and 51 may be designed so as to maintain substantially constant bandwidth limits in the amplifier system as the mutual conductance of the discharge devices associated therewith is changed, or when desired, these thermistors may be designed to provide over-all bandwidth limits in the system which increase as the mutual conductance of the discharge devices decreases.

The present system therefore provides a multistage amplifier by means of which a high gain may be realized and concurrently therewith broadband response characteristics are maintained. Means are also provided in such a system for varying the bandwidth limits either manually or automatically in response to the strength of an applied signal.

While certain specified embodiments have been shown and described it will of course be understood that various modifications may be made without departing from the invention. The appended claims are, therefore, intended to cover any such modifications as fall within the true spirit and scope of this invention.

What I claim as new and desire to secure by Letters Patent of the United States is:

1. An amplifier system comprising a plurality of cascaded electron discharge devices, each of said devices having an anode and a control electrode, means for impressing signals on the control electrode of the first device of said system, tuned circuit means for coupling the respective anodes of each of said devices to the control electrode of the next succeeding device in said system, an output circuit coupled to the anode of the final discharge device of said system, degenerative resistance means for coupling the respective anodes of each of said devices to the anode of the next preceding device in said system, and control means for varying the gain of said electron discharge devices, each of said resistance means having such resistance-current characteristic that the resistance thereof varies inversely with the degenerative current passing therethrough, whereby the degenerative feedback energy between said stages and the bandwidth of said system are both functions of the gain of said stages.

2. An amplifier system comprising a plurality of cascaded amplifier stages, each of said stages including an electron discharge device having an anode and a control electrode, means for impressing signals to be amplified on the control electrode of the first discharge device of said system, single tuned circuit means for coupling the respective anodes of each of said devices to the control electrode of the next succeeding discharge device, an output circuit connected to the anode of the final discharge device of said system, degenerative resistor means coupling the respective anodes of each of said devices to the anode of the next preceding discharge device, each of said resistor means having a resistance value which varies inversely with the magnitude of the current flowing therethrough, means for impressing an operating bias voltage on one or more of said amplifier stages, and means for independently adjusting said bias voltage to adjust the overall gain of the system.

3. An amplifier system comprising a plurality of cascaded amplifier stages, single tuned circuits coupling successive amplifier stages one to the other, degenerative feedback means coupling the output of each of said respective stages to the next preceding stage to increase the over-all bandwidth characteristics of said amplifying system, each of said degenerative feedback means comprising a resistor having a value of resistance which varies inversely with the magnitude of the current flowing therethrough, means for impressing an operating bias voltage on one or more of said amplifier stages, and means for independently adjusting said bias voltage to adjust the overall gain of the system.

JOSEPH A. WORCESTER, Jr.

REFERENCES CITED

The following references are of record in the file of this patent:

UNITED STATES PATENTS

| Number | Name | Date |
|---|---|---|
| 2,152,618 | Wheeler | Mar. 28, 1939 |
| 2,179,956 | Roberts | Nov. 14, 1939 |
| 2,369,030 | Edwards | Feb. 6, 1945 |
| 2,498,561 | Lipkin | Feb. 21, 1950 |
| 2,562,894 | De Mengel | Aug. 7, 1951 |